United States Patent
Doucet et al.

(10) Patent No.: US 11,518,864 B2
(45) Date of Patent: Dec. 6, 2022

(54) CATALYTIC MICROWAVE DEPOLYMERISATION OF PLASTIC FOR PRODUCTION OF MONOMER AND WAXES

(71) Applicant: Pyrowave Inc., Oakville (CA)

(72) Inventors: Jocelyn Doucet, Montreal (CA); Jean-Philippe Laviolette, Montreal (CA)

(73) Assignee: Pyrowave Inc., Oakville (CA)

( * ) Notice: Subject to any disclaimer, the term of this patent is extended or adjusted under 35 U.S.C. 154(b) by 943 days.

(21) Appl. No.: 16/321,693

(22) PCT Filed: Jul. 28, 2017

(86) PCT No.: PCT/CA2017/050905
§ 371 (c)(1),
(2) Date: Jan. 29, 2019

(87) PCT Pub. No.: WO2018/018153
PCT Pub. Date: Feb. 1, 2018

(65) Prior Publication Data
US 2021/0284818 A1    Sep. 16, 2021

Related U.S. Application Data

(60) Provisional application No. 62/368,315, filed on Jul. 29, 2016.

(51) Int. Cl.
*C08J 11/12* (2006.01)
*B01J 19/12* (2006.01)
*C10B 53/07* (2006.01)

(52) U.S. Cl.
CPC ............ *C08J 11/12* (2013.01); *B01J 19/126* (2013.01); *C10B 53/07* (2013.01); *B01J 2219/0892* (2013.01); *B01J 2219/1206* (2013.01)

(58) Field of Classification Search
CPC ... C08J 11/12; C08J 11/14; C08J 11/16; B01J 19/126; B01J 2219/0892; B01J 2219/1206; C10B 53/07; Y02W 30/62
See application file for complete search history.

(56) References Cited

U.S. PATENT DOCUMENTS

2014/0020286 A1*  1/2014  Doucet ................ C10K 3/02
585/16

FOREIGN PATENT DOCUMENTS

WO    2011045638 A2    4/2011

OTHER PUBLICATIONS

Zahid Hussain et al., "Microwave-metal interaction pyrolysis of polystyrene", Journal of Analytical and Applied Pyrolysis, 89(1), 2010, p. 39-43.

(Continued)

*Primary Examiner* — Brian A McCaig
(74) *Attorney, Agent, or Firm* — Taft Stettinius & Hollister LLP

(57) ABSTRACT

There is described a microwave pyrolysis process for the depolymerization of plastic for the production of monomers, waxes and heavy oils including the steps of: a) steam purge of the plastic from about 0.5% to about 50% w/w of a catalyst, in a media; b) pyrolysis of the plastic and the catalyst in the media with a microwave (MW) for a time sufficient to allow generation of heat providing a thermal treatment between 300° C. and 650° C. through absorption of microwaves by the catalyst and the media. The catalyst includes a compound having a high dielectric loss at the frequency of the MW to absorb microwaves, transfer heat to the plastic and initiate a pyrolysis reaction.

25 Claims, 1 Drawing Sheet

(56) References Cited

OTHER PUBLICATIONS

Mohammad Nahid Siddiqui et al., "Recycling of poly(ethylene terephthalate) waste through methanolic pyrolysis in a microwave reactor", Journal of Analytical and Applied Pyrolysis, 98, 2012, p. 214-220.
International Search Report, Canadian Intellectual Property Office, International Application No. PCT/CA2017/050905, dated Oct. 20, 2017, 3 pages.
Written Opinion of the International Searching Authority, Canadian Intellectual Property Office, International Application No. PCT/CA2017/050905, dated Oct. 20, 2017, 4 pages.

* cited by examiner

CATALYTIC MICROWAVE DEPOLYMERISATION OF PLASTIC FOR PRODUCTION OF MONOMER AND WAXES

CROSS-REFERENCE TO RELATED APPLICATIONS

This application is a U.S. National Phase of International PCT Application No. PCT/CA2017/050905 filed on Jul. 28, 2017, which claims the benefit of U.S. Provisional Application No. 62/368,315 filed on Jul. 29, 2016, the contents of each application are hereby incorporated by reference in their entirety.

BACKGROUND

(a) Field

The subject matter disclosed generally relates to a pyrolysis process. More specifically, the subject matter relates to a pyrolysis process for the depolymerization of plastic for the production of monomers, waxes and heavy oils.

(b) Related Prior Art

Synthetic resins have been widely used for producing plastic products, packaging containers and packaging materials for foods, clothing and other variety of products. Use of certain plastic materials does necessarily result in generation of an amount of waste plastics from factories, product distribution systems and users. In recent years, the amount of production of plastic materials is more and more increasing to meet the consumers' demand in the market for ever-increasing variety and amount of plastic materials which leads to unavoidable increased generation of waste plastics as industrial and home wastes in every place and the processing of the wastes is a heavy burden on the manufacturers, the distributors and the communities.

Most of the industrial wastes have been buried in the ground or otherwise processed by the waste processors, whereas the home wastes have been incinerated at waste disposal facilities or buried in the ground by the communities.

Plastic wastes are sources of air and underground water pollution and disposal of waste plastics often causes environmental pollution. Plastic waste is increasingly negatively perceived, and certain jurisdictions are beginning to ban certain plastics, such as polystyrene.

Accordingly, recycling of the plastic wastes in one way or other will greatly contribute to benefit of the society.

Recycling of waste plastics by regenerating and reusing the plastic materials has been tried on some plastic materials among the plastic wastes. For example, from supermarkets or other fresh food markets, styrene resins such as foamed polystyrene used for packaging have been recovered in a large scale. Also, from the product distributors who handle electronic machines or parts of automobiles, waste plastic of ABS resin has been recovered in a large amount. Also, the manufacturers of these packaging materials, electronic machines and automobiles are sources of large amount of waste plastic materials. Polypropylene resin is also similarly used in these areas.

The conventional recycling methods for recovering plastic materials such as polystyrene, ABS resin or polypropylene from waste plastics utilize their property that they are capable of being molten at two hundred and several tens degrees centigrade, wherein the waste is washed with water, dehydrated, ground into powder, subjected to screening or compaction, melt-extruded and then formed into pellets. Foamed polystyrene is a relatively pure material and accordingly is best suited for recycling among all kinds of synthetic resins.

Therefore, a principal object of the present invention is to overcome any difficulties of the conventional method and to provide a novel method for economically recover waxes, monomers and heavy oils from thermoplastic polymers such as polystyrene, ABS, polyethylene and polypropylene from plastic wastes containing one of them to provide a recycled product of good quality.

SUMMARY

According to an embodiment, there is provided a microwave pyrolysis process for the depolymerization of plastic for the production of monomers, waxes and heavy oils comprising the steps of.

steam purge of the plastic and from about 0.5% to about 50% w/w of a catalyst, in a media;

pyrolysis of the plastic and the catalyst in the media with a microwave (MW) for a time sufficient to allow generation of heat providing a thermal treatment between 300° C. and 650° C. through absorption of microwaves by the catalyst and the media, wherein the catalyst comprises a compound having a high dielectric loss at a frequency of the MW to absorb microwaves, transfer heat to said plastic and initiate a pyrolysis reaction.

The media may be agitated under mixing conditions minimizing segregation of the plastic and the catalyst.

The media may be eccentric relative to a longitudinal axis of rotation of the media.

The catalyst may be present at about 0.5% to about 5% w/w of the reaction.

The catalyst may be present at about 0.5% to about 2.5% w/w of the reaction.

The thermal treatment may be between 350° C. and 500° C.

The catalyst may be the carbonaceous residue from a previously performed pyrolysis reaction, a ceramic bead comprising microwave absorbing additives, a pellet comprising microwave absorbing additives, or combinations thereof.

The microwave absorbing additive may be a silicon carbide.

The internal wall of the media may be heated at a temperature sufficient to avoid solidification of a material thereon.

The temperature sufficient to avoid solidification of a material thereon may be about 200-250° C.

The oxygen content within the media may be monitored prior to initiation of step b), to ensure all oxygen is purged.

The step b) may be initiated when the oxygen content is at a suitable residual content for the pyrolysis to proceed.

The suitable residual content of oxygen may be about 10% v/v.

The suitable residual content of oxygen may be about 5% v/v.

The plastic may be shredded prior to the steam purge.

The microwave has frequency from about 915 MHz or 2450 MHz.

The pyrolysis process of the present invention may further comprising step c):

c) condensing the waxes in a first condenser having an operating temperature sufficient to maintain the waxes liquid, and the monomers and heavy oils in a vapor form, to provide a condensed waxes fraction;

condensing the monomers and heavy oils in a second condenser having an operating temperature lower than the first condenser and sufficient to maintain the monomers and heavy oils liquid and provide a condensed monomers and heavy oils fraction, or a combination thereof.

The first condenser operating temperature that maintains the waxes fraction liquid, such as from about 55° C. to about 90° C.

The first condenser operating temperature may be about 80° C.

The first condenser operating temperature may be a temperature around the dew point of a compound to be recovered.

The first condenser may be further operable to recover a dimer and/or a trimer not decomposed to a monomer stage during the pyrolysis.

These pyrolysis process of the present invention may further comprise the step of reintroducing the dimer and/or trimer into the media for further pyrolysis.

The second condenser operating temperature that maintains monomers and heavy oils in a vapor form, such as from about 2° C. to about 10° C.

The first condenser operating temperature may be about 4° C.

The pyrolysis process of the present invention may further comprising step d):

d) pumping the condensed waxes fraction in a first container; pumping the a condensed monomers and heavy oils fraction in a second container or pumping said condensed waxes fraction, and/or a condensed monomers and/or a heavy oils fraction into said media, for further pyrolysis, or a combination thereof.

The first container and the second container are the same.

The pyrolysis process may further comprising step e):

e) fractionating the condensed waxes fraction to obtain a purified wax; fractionating the condensed monomers and heavy oils fraction to obtain purified monomers and purified heavy oil, or combinations thereof.

According to another embodiment, there is provided a purified waxes produced by the process of the present invention.

According to another embodiment, there is provided a purified monomers produced by the process of any one of the present invention.

According to another embodiment, there is provided a purified heavy oils produced by the process of any one the present invention.

The following terms are defined below.

The term "char" or "carbonaceous by-product" is intended to mean the char used as an embedded catalyst in the process of the present invention, a hot catalyst phase used in the process of the present invention, as well as a self-generated product of the process of the present invention. This "carbonaceous by-product" or "char" may be composed of over 80% carbon.

The term "catalyst" is intended to mean a compound having a high dielectric loss at the operating frequency of the MW reactor, which in some embodiments may be the carbonaceous residue from a previously performed pyrolysis reaction, a ceramic bead or pellet comprising microwave absorbing additives such as metal oxides and carbides, such as silicon carbide, silicium carbide (SiC), alumina 44%, or combinations thereof.

The term "media" is intended to mean a container in which the reaction is carried out. For example, a pyrolysis reactor or a pyrolysis reactor system which is appropriately configured to perform the process.

The term "pyrolysis" is intended to mean the chemical decomposition of condensed substances by heating that occurs spontaneously at high enough temperatures. The word is coined from the Greek-derived elements pyro "fire" and lysys "decomposition". According to a preferred embodiment, the pyrolysis performed in the process and system of the present invention is a "fast" pyrolysis which favors the production of pyrolysis oil over that of pyrolysis gas.

The term "microwave" is intended to mean electromagnetic waves with wavelengths ranging from as long as one meter to as short as one millimeter, or equivalently, with frequencies between 300 MHz (0.3 GHz) and 300 GHz. Preferably, the range of microwaves suitable to be used in the present invention is from about 915 MHz or 2450 MHz.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
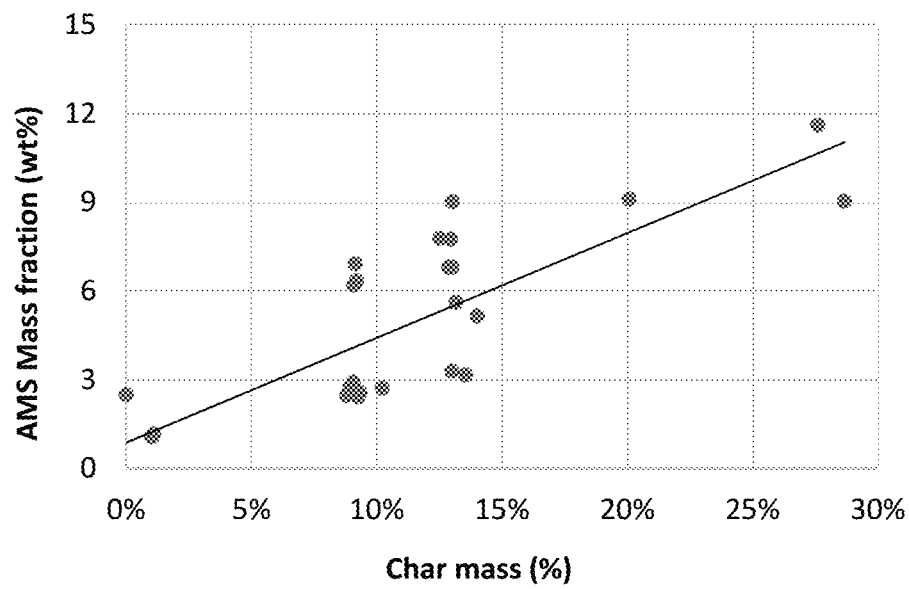
FIG. 1 illustrates the effect of catalyst loading on alpha methyl styrene (AMS) mass fraction in the output oil.

In embodiments there is disclosed a microwave pyrolysis process for the depolymerization of plastic, for the production of monomers, waxes and heavy oils. The process comprises the steps of:

a) steam purge of the plastic and from about 0.5% to about 50% w/w of a catalyst, in a media;

b) pyrolysis of the plastic and the catalyst in the media with a microwave (MW) for a time sufficient to allow generation of heat providing a thermal treatment between 300° C. and 600° C. through absorption of microwaves by the catalyst and the media, wherein the catalyst comprises a compound having a high dielectric loss at the frequency of the MW to absorb microwaves, transfer heat to the plastic and initiate a pyrolysis reaction.

In embodiments, the process involves the microwave pyrolysis of plastic material. As used herein, the term plastic is intended to mean any polymers of high molecular mass, and their other constituents. They may be synthetic, but also include natural polymers. Polymers of interest include Polyethylene terephthalate (PET), High-density polyethylene (HDPE), Polyvinyl chloride (PVC). Low-density polyethylene (LDPE), polypropylene (PP), polystyrene (PS), polycarbonate (PC). One preferred embodiment includes polystyrene (PS). According to an embodiment, the plastic may be shredded prior to the steam purge.

In embodiments, the media is any container in which the reaction is carried out. For example, a pyrolysis reactor or a pyrolysis reactor system which is appropriately configured to perform the process. According to an embodiment, the media is a horizontally arranged rotating drum. According to an embodiment the media may be agitated under mixing conditions which minimize the segregation of the plastic and the catalyst. For example, the media may be eccentric relative to a longitudinal axis of rotation of the media. For example, the media may be eccentric by about 2° to about 7° relative to the longitudinal axis of the media, such that upon rotation, the material therein will be mixed by the wavelike motion of the rotating media. The eccentricity is required to provide mixing without baffles which otherwise would trigger arcs in the cavity in presence of high electromagnetic field. According to an embodiment, the rotating media is eccentric by about 2° to about 7°, or from about 2° to about 6°, or from about 2° to about 5°, or from about 2° to about 4°, or from about 2° to about 3°, or about 3° to about 7°, or from about 3° to about 6°, or from about 3° to about 5°, or from about 3° to about 4°, or about 4° to about 7°, or from about 4° to about 6°, or from about 4° to about 5°, or about 5° to about 7°, or from about 5° to about 6°, or about 6° to about 7°, or 2°, 3°, 4°, 5°, 6°, 7°.

In another embodiment, the internal wall of the media (e.g. the rotating drum) may be heated at a temperature sufficient to avoid solidification of a material thereon, after a microwave pyrolysis reaction, or to liquefy a material after it as solidified. According to an embodiment, the inner media is heated with electrical wires to maintain the inner wall at a certain temperature (for example 200° C., or a minimum of 200° C., or higher, or lower, depending on the material treated in the media) and avoid solidification of melted plastic or wax material at any given time. According to another embodiment, steam could be used to heat the inner drum.

The pyrolysis process in accordance with one embodiment is entirely based on microwave pyrolysis such that heat is provided through absorption of microwaves by the catalyst and by the media itself. Therefore, the addition of a catalyst is required to absorb microwaves and transfer heat to the microwave-transparent waste which initiates the pyrolysis reaction. In embodiments, the catalyst may be a compound having a high dielectric loss at the operating frequency of the MW reactor, which in some embodiments may be the carbonaceous residue from a previously performed pyrolysis reaction, a ceramic bead or pellet comprising microwave absorbing additives such as ceramics (silicon carbide, silicium carbide, low purity alumina, for example), ferroelectric materials (barium titanate, for example), metal oxides (iron oxide, for example), or combinations thereof.

In some embodiments, the dielectric properties of the carbonaceous by-product (also called char) lead it to heat to considerably higher levels than the plastic material being treated at the same microwave power. Catalysts (carbonaceous by-product/char) may be pre-mixed with plastic material to act as a strong embedded heater in the material bed. This leads to higher temperatures being achieved in the bed without increasing the microwave power. This, in turn, leads to reduced processing times, energy consumption, and capital cost of additional high-power microwave generators.

Other forms of pure carbon, such as graphite and activated carbon, also exhibit heating behaviour in a microwave field. However, there is a clear advantage of using the carbonaceous by-product/char as it is a by-product of the process itself. In addition, the presence of the carbonaceous by-product/char may lead to catalytic effects which affect the product distribution and composition. However, the key role of the carbonaceous by-product/char (which is usually in near-powder form) is to form a hot bed in which the plastic can be converted.

The carbonaceous product could be distributed through the bed either by natural percolation (i.e. by adding a predetermined amount of product at the top of the reactor uniformly) or by using a mechanically assisted device as described above.

Figure 2:
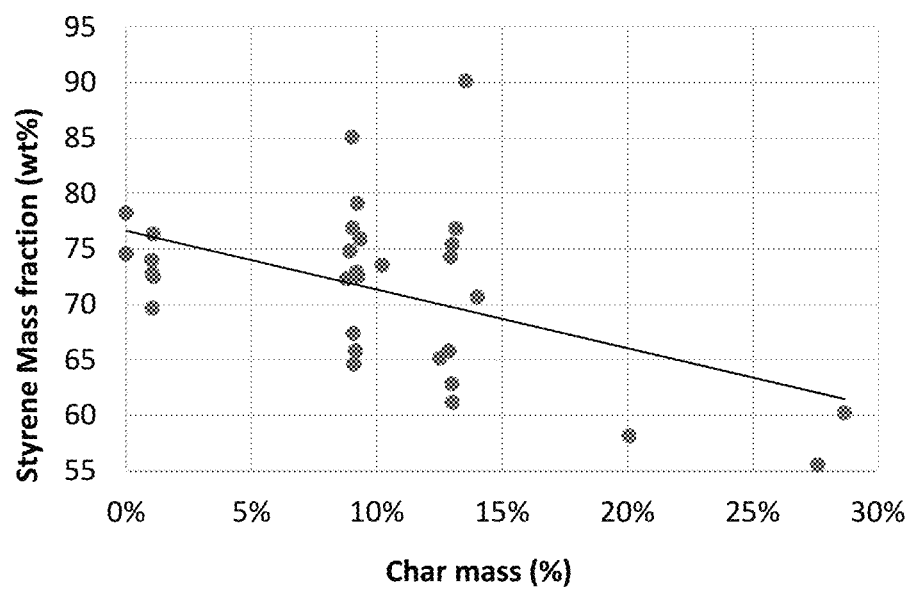
FIG. 2 illustrates the effect of catalyst loading on styrene yields.

Unexpectedly, it has been found that varying the amount of catalyst will have a profound effect on the production of waxes, monomers and heavy oils from the plastic material. Now referring to FIG. 1, it is shown that the output of the process reaction is dependent on the amount of catalyst present in the reactor and bed temperature. FIG. 1 shows that with increasing concentrations of char (the catalyst), the process reaction with polystyrene as starting plastic, will generate increasing concentrations of alpha methyl styrene, an unwanted side product. Shown in FIG. 2 is the effect of increasing concentration of char (the catalyst) on the production of styrene. As the concentration of char increases, the mass fraction of styrene decreases significantly.

For different plastic material, different chemicals will be produced if the amount of catalyst is changed.

Therefore, according to embodiments, the catalyst may be present in the pyrolysis process of the present invention at about 0.5% to about 50% w/w of the reaction, or from about 0.5% to about 45%, or from about 0.5% to about 40%, or from about 0.5% to about 35%, or from about 0.5% to about 30%, or from about 0.5% to about 25%, or from about 0.5% to about 20%, or from about 0.5% to about 15%, or from about 0.5% to about 10%, or from about 0.5% to about 9%, or from about 0.5% to about 8%, or from about 0.5% to about 7%, or from about 0.5% to about 6%, or from about 0.5% to about 5%, or from about 0.5% to about 4.5%, or from about 0.5% to about 4%, or from about 0.5% to about 3.5%, or from about 0.5% to about 3%, or from about 0.5% to about 2.5% w/w, or from about 0.5% to about 2%, or w/w or from about 0.5% to about 1.25% w/w or from about 0.5% to about 1% of the reaction, or 1% to about 50% w/w of the reaction, or from about 1 to about 45%, or from about 1 to about 40%, or from about 1 to about 35%, or from about 1 to about 30%, or from about 1 to about 25%, or from about 1 to about 20%, or from about 1 to about 15%, or from about 1 to about 10%, or from about 1 to about 9%, or from about 1 to about 8%, or from about 1 to about 7%, or from about 1 to about 6%, or from about 1 to about 5%, or from about 1 to about 4.5%, or from about 1 to about 4%, or from about 1 to about 3.5%, or from about 1 to about 3%, or from about 1 to about 2.5% w/w, or from about 1 to about 2%, or w/w or from about 1 to about 1.25% w/w, or 2% to about 50% w/w of the reaction, or from about 2% to about 45%, or from about 2% to about 40%, or from about 2% to about 35%, or from about 2% to about 30%, or from about 2% to about 25%, or from about 2% to about 20%, or from about 2% to about 15%, or from about 2% to about 10%, or from about 2% to about 9%, or from about 2% to about 8%, or from about 2% to about 7%, or from about 2% to about 6%, or from about 2% to about 5%, or from about 2% to about 4.5%, or from about 2% to about 4%, or from about 2% to about 3.5%, or from about 2% to about 3%, or from about 2% to about 2.5% w/w, or 2.5% to about 50% w/w of the reaction, or from about 2.5% to about 45%, or from about 2.5% to about 40%, or from about 2.5% to about 35%, or from about 2.5% to about 30%, or from about 2.5% to about 25%, or from about 2.5% to about 20%, or from about 2.5% to about 15%, or from about 2.5% to about 10%, or from about 2.5% to about 9%, or from about 2.5% to about 8%, or from about 2.5% to about 7%, or from about 2.5% to about 6%, or from about 2.5% to about 5%, or from about 2.5% to about 4.5%, or from about 2.5% to about 4%, or from about 2.5% to about 3.5%, or from about 2.5% to about 3%, or 3% to about 50% w/w of the reaction, or from about 3% to about 45%, or from about 3% to about 40%, or from about 3% to about 35%, or from about 3% to about 30%, or from about 3% to about 25%, or from about 3% to about 20%, or from about 3% to about 15%, or from about 3% to about 10%, or from about 3% to about 9%, or from about 3% to about 8%, or from about 3% to about 7%, or from about 3% to about 6%, or from about 3% to about 5%, or from about 3% to about 4.5%, or from about 3% to about 4%, or from about 3% to about 3.5%, or 3.5% to about 50% w/w of the reaction, or from about 3.5% to about 45%, or from about 3.5% to about 40%, or from about 3.5% to about 35%, or from about 3.5% to about 30%, or from about 3.5% to about 25%, or from about 3.5% to about 20%, or from about 3.5% to about 15%, or from about 3.5% to about 10%, or from about 3.5% to about 9%, or from about 3.5% to about 8%, or from about 3.5% to about 7%, or from about 3.5% to about 6%, or from about 3.5% to about 5%, or from about 3.5% to about 4.5%, or from about 3.5% to about 4%, or 4% to about 50% w/w of the reaction, or from about 4% to about 45%, or from about 4% to about 40%, or from about 4% to about 35%, or from about 4% to about 30%, or from about 4% to about 25%, or from about 4% to about 20%, or from about 4% to about 15%, or from about 4% to about 10%, or from about 4% to about 9%, or from about 4% to about 8%, or from about 4% to about 7%, or from about 4% to about 6%, or from about 4% to about 5%, or from about 4% to about 4.5%, or 4.5% to about 50% w/w of the reaction, or from about 4.5% to about 45%, or from about 4.5% to about 40%, or from about 4.5% to about 35%, or from about 4.5% to about 30%, or from about 4.5% to about 25%, or from about 4.5% to about 20%, or from about 4.5% to about 15%, or from about 4.5% to about 10%, or from about 4.5% to about 9%, or from about 4.5% to about 8%, or from about 4.5% to about 7%, or from about 4.5% to about 6%, or from about 4.5% to about 5%, or 5% to about 50% w/w of the reaction, or from about 5% to about 45%, or from about 5% to about 40%, or from about 5% to about 35%, or from about 5% to about 30%, or from about 5% to about 25%, or from about 5% to about 20%, or from about 5% to about 15%, or from about 5% to about 10%, or from about 5% to about 9%, or from about 5% to about 8%, or from about 5% to about 7%, or from about 5% to about 6%, or 5.5% to about 50% w/w of the reaction, or from about 5.5% to about 45%, or from about 5.5% to about 40%, or from about 5.5% to about 35%, or from about 5.5% to about 30%, or from about 5.5% to about 25%, or from about 5.5% to about 20%, or from about 5.5% to about 15%, or from about 5.5% to about 10%, or from about 5.5% to about 9%, or from about 5.5% to about 8%, or from about 5.5% to about 7%, or from about 5.5% to about 6%, or 6% to about 50% w/w of the reaction, or from about 6% to about 45%, or from about 6% to about 40%, or from about 6% to about 35%, or from about 6% to about 30%, or from about 6% to about 25%, or from about 6% to about 20%, or from about 6% to about 15%, or from about 6% to about 10%, or from about 6% to about 9%, or from about 6% to about 8%, or from about 6% to about 7%, 7% to about 50% w/w of the reaction, or from about 7% to about 45%, or from about 7% to about 40%, or from about 7% to about 35%, or from about 7% to about 30%, or from about 7% to about 25%, or from about 7% to about 20%, or from about 7% to about 15%, or from about 7% to about 10%, or from about 7% to about 9%, or from about 7% to about 8%, 8% to about 50% w/w of the reaction, or from about 8% to about 45%, or from about 8% to about 40%, or from about 8% to about 35%, or from about 8% to about 30%, or from about 8% to about 25%, or from about 8% to about 20%, or from about 8% to about 15%, or from about 8% to about 10%, or from about 8% to about 9%, 9% to about 50% w/w of the reaction, or from about 9% to about 45%, or from about 9% to about 40%, or from about 9% to about 35%, or from about 9% to about 30%, or from about 9% to about 25%, or from about 9% to about 20%, or from about 9% to about 15%, or from about 9% to about 10%, 10% to about 50% w/w of the reaction, or from about 10% to about 45%, or from about 10% to about 40%, or from about 10% to about 35%, or from about 10% to about 30%, or from about 10% to about 25%, or from about 10% to about 20%, or from about 10% to about 15%, 15% to about 50% w/w of the reaction, or from about 15% to about 45%, or from about 15% to about 40%, or from about 15% to about 35%, or from about 15% to about 30%, or from about 15% to about 25%, or from about 15% to about 20%, 20% to about 50% w/w of the reaction, or from about 20% to about 45%, or from about 20% to about 40%, or from about 20% to about 35%, or from about 20% to about 30%, or from about 20% to about 25%, 25% to about 50% w/w of the reaction, or from about 25% to about 45%, or from about 25% to about 40%, or from about 25% to about 35%, or from about 25% to about 30%, 30% to about 50% w/w of the reaction, or from about 30% to about 45%, or from about 30% to about 40%, or from about 30% to about 35%, 35% to about 50% w/w of the reaction, or from about 35% to about 45%, or from about 35% to about 40%, 40% to about 50% w/w of the reaction, or from about 40% to about 45%, 45% to about 50% w/w of the reaction, or from about 1% to about 9%, or from about 1% to about 8%, or from about 1% to about 7%, or from about 1% to about 6%, or from about 1% to about 5%, or from about 1% to about 4.5%, or from about 1% to about 4%, or from about 1% to about 3.5%, or from about 1% to about 3%, or from about 1% to about 2.5% w/w, or from about 1% to about 2%, or w/w or from about 1% to about 1.25% w/w, or from about 1.25% to about 9%, or from about 1.25% to about 8%, or from about 1.25% to about 7%, or from about 1.25% to about 6%, or from about 1.25% to about 5%, or from about 1.25% to about 4.5%, or from about 1.25% to about 4%, or from about 1.25% to about 3.5%, or from about 1.25% to about 3%, or from about 1.25% to about 2.5% w/w, or from about 1.25% to about 2%, or from about 2% to about 9%, or from about 2% to about 8%, or from about 2% to about 7%, or from about 2% to about 6%, or from about 2% to about 5%, or from about 2% to about 4.5%, or from about 2% to about 4%, or from about 2% to about 3.5%, or from about 2% to about 3%, or from about 2% to about 2.5% w/w, or from about 2.5% to about 9%, or from about 2.5% to about 8%, or from about 2.5% to about 7%, or from about 2.5% to about 6%, or from about 2.5% to about 5%, or from about 2.5% to about 4.5%, or from about 2.5% to about 4%, or from about 2.5% to about 3.5%, or from about 2.5% to about 3%, or from about 3% to about 9%, or from about 3% to about 8%, or from about 3% to about 7%, or from about 3% to about 6%, or from about 3% to about 5%, or from about 3% to about 4.5%, or from about 3% to about 4%, or from about 3% to about 3.5%, or from about 3.5% to about 9%, or from about 3.5% to about 8%, or from about 3.5% to about 7%, or from about 3.5% to about 6%, or from about 3.5% to about 5%, or from about 3.5% to about 4.5%, or from about 3.5% to about 4%, or from about 4% to about 9%, or from about 4% to about 8%, or from about 4% to about 7%, or from about 4% to about 6%, or from about 4% to about 5%, or from about 4% to about 4.5%, or from about 4.5% to about 9%, or from about 4.5% to about 8%, or from about 4.5% to about 7%, or from about 4.5% to about 6%, or from about 4.5% to about 5%, or from about 5% to about 9%, or from about 5% to about 8%, or from about 5% to about 7%, or from about 5% to about 6%, or from about 6% to about 9%, or from about 6% to about 8%, or from about 6% to about 7%, or from about 7% to about 9%, or from about 7% to about 8%, or from about 8% to about 9%, or about 50%, about 49%, about 48%, about 47%, about 46%, about 45%, about 44%, about 43%, about 42%, about 41%, about 40%, about 39%, about 38%, about 37%, about 36%, about 35%, about 34%, about 33%, about 32%, about 31%, about 30%, about 29%, about 28%, about 27%, about 26%, about 25%, about 24%, about 23%, about 22%, about 21%, about 20%, about 19%, about 18%, about 17%, about 16%, about 15%, about 14%, about 13%, about 12%, about 11%, about 10%, about 9%, about 8%, about 7%, about 6%, about 5%, about 4%, about 3%, about 2%, about 1%, or about 0.5%.

According to another embodiment, the output of the reaction is also dependent on the bed temperature (thermal treatment temperature). For different plastic material, different chemicals will be produced if the bed temperature is changed. Thus, the pyrolysis process of the present invention may be performed at temperatures of between about 300° C. and about 650° C., or from about 310° C. and about 650° C., or from about 315° C. and about 650° C., or from about 325° C. and about 650° C., or from about 350° C. and about 650° C., or from about 400° C. and about 650° C., or from about 450° C. and about 650° C., or from about 500° C. and about 650° C., or from about 550° C. and about 650° C., or from about 600° C. and about 650° C., or about 300° C. and about 600° C. or from about 310° C. and about 600° C., or from about 315° C. and about 600° C., or from about 325° C. and about 600° C., or from about 350° C. and about 600° C., or from about 400° C. and about 600° C., or from about 450° C. and about 600° C., or from about 500° C. and about 600° C. or from about 550° C. and about 600° C., or about 300° C. and about 550° C., or from about 310° C. and about 550° C., or from about 315° C. and about 550° C., or from about 325° C. and about 550° C., or from about 350° C. and about 550° C., or from about 400° C. and about 550° C., or from about 450° C. and about 550° C., or from about 500° C. and about 550° C., or about 300° C. and about 500° C., or from about 310° C. and about 500° C., or from about 315° C. and about 500° C., or from about 325° C. and about 500° C., or from about 350° C. and about 500° C., or from about 400° C. and about 500° C., or from about 450° C. and about 500° C., or about 300° C. and about 450° C. or from about 310° C. and about 450° C. or from about 315° C. and about 450° C., or from about 325° C. and about 450° C., or from about 350° C. and about 450° C., or from about 400° C. and about 450° C., or about 300° C. and about 400° C., or from about 310° C. and about 400° C., or from about 315° C. and about 400° C., or from about 325° C. and about 400° C., or from about 350° C. and about 400° C., or about 300° C. and about 350° C., or from about 310° C. and about 350° C., or from about 315° C. and about 350° C., or from about 325° C. and about 350° C. According to embodiments, thermal treatment is between about 350° C. and about 500° C.

According to another embodiment of the present invention, the pyrolysis process involves monitoring the oxygen content within the media is prior to initiation of step b), to ensure all oxygen is purged. Suitable purge of oxygen from the media ensures a safe operation without combustion and explosion. Therefore, in embodiment, during the pyrolysis process, step b) is initiated when the oxygen content is at a suitable residual content for the pyrolysis to proceed, for example about 10% v/v, or about 9, 8, 7, 6, 5, 4, 3, 2, 1, 0% v/v, or from about 0 to about 10% v/v, or from about 0 to about 9% v/v, or from about 0 to about 8% v/v, or from about 0 to about 7% v/v, or from about 0 to about 6% v/v, or from about 0 to about 5% v/v, or from about 0 to about 4% v/v, or from about 0 to about 3% v/v, or from about 0 to about 2% v/v, or from about 0 to about 1% v/v, and preferably about 5% v/v.

Also, in the pyrolysis process of the present invention, the microwave may have a frequency from about 915 MHz to 2450 MHz, or about 915 MHz or 2450 MHz, or 915 MHz, or 2450 MHz.

The pyrolysis process of the present invention may also comprise step c) of condensing the waxes in a first condenser having an operating temperature sufficient to maintain the waxes liquid, and the monomers and heavy oils in a vapor form, to provide a condensed waxes fraction. The step c may also include condensing the monomers and heavy oils in a second condenser having an operating temperature lower than the first condenser and sufficient to maintain the monomers and heavy oils liquid and provide a condensed monomers and heavy oils fraction. Step c may also be a combination of both condensation steps. In embodiments, the first condenser operating temperature may be from about 55° C. to about 90° C., or from about 60° C. to about 90° C., or from about 65° C. to about 90° C., or from about 70° C. to about 90° C., or from about 75° C. to about 90° C., or from about 80° C. to about 90° C., or from about 85° C. to about 90° C., or from about 55° C. to about 85° C., or from about 60° C. to about 85° C., or from about 65° C. to about 85° C., or from about 70° C. to about 85° C., or from about 75° C. to about 85° C. or from about 80° C. to about 85° C., or from about 55° C. to about 80° C., or from about 60° C. to about 80° C., or from about 65° C. to about 80° C., or from about 70° C. to about 80° C., or from about 75° C. to about 80° C., or from about 55° C. to about 75° C., or from about 60° C. to about 75° C., or from about 65° C. to about 75° C., or from about 70° C. to about 75° C., or from about 55° C. to about 70° C. or from about 60° C. to about 70° C., or from about 65° C. to about 70° C., or from about 55° C. to about 65° C., or from about 60° C. to about 65° C., or from about 55° C. to about 60° C., and preferably about 80° C. In an embodiment, the first condenser operating temperature may be a temperature around the dew point of a compound to be recovered. In yet another embodiment, the first condenser may be further operable to recover a dimer and/or a trimer not decomposed to the monomer stage during the pyrolysis step. In another embodiment, the pyrolysis process of the present invention may also further comprise the step of reintroducing the dimer and/or trimer into the media for further pyrolysis.

In another embodiment, the second condenser operating temperature may be from about 2° C. to about 10° C., and preferably about 4° C.

The pyrolysis process of the present invention may further comprise step d) of pumping the condensed waxes fraction in a first container; pumping the condensed monomers and heavy oils fraction in a second container, or pumping the condensed waxes fraction, and/or a condensed monomers and/or a heavy oils fraction into the media, for further pyrolysis, or a combination thereof. According to another embodiment, the first container and the second container are the same—i.e. the fractions are pumped into the same container.

According to another embodiment, the pyrolysis process of the present invention may further comprise step e) of fractionating the condensed waxes fraction to obtain a purified wax; fractionating the condensed monomers and heavy oils fraction to obtain purified monomers and purified heavy oil, or combinations thereof.

In embodiments, the process of the present invention yields purified waxes, purified monomers and purified heavy oils.

The present invention will be more readily understood by referring to the following examples which are given to illustrate the invention rather than to limit its scope.

EXAMPLE 1

Fractionation of Fractions

The liquid fractions obtained from condensation into waxes, monomers and heavy oils fraction are then fractionated using standard distillation techniques to recover monomer (styrene, ethylbenzene and toluene) as well as high purity wax using short path distillation, as well as heavy oils. The standards for styrene monomer are: <1% AMS content and >75% Styrene content. The standards for commercial waxes are: <1% C20 hydrocarbons Table 1 below shows that a two pass distillation yields high quality commercial wax.

TABLE 1

Results showing that the wax produced by the process of the present invention can match industry standards (<1% C20 hydrocarbons) with 2 passes in a short path distillation process.

| Component | Mass fraction (% wt) | | | |
|---|---|---|---|---|
| | Crude wax | Distilled wax (1st pass) | Distilled wax (1st pass-simulation) | Distilled wax (2nd pass) |
| C10 | 6.7 | 0.0 | 0.0 | 0.0 |
| C11 | 6.2 | 0.0 | 0.0 | 0.0 |
| C12 | 5.8 | 0.0 | 0.0 | 0.0 |
| C13 | 6.5 | 0.0 | 0.0 | 0.0 |
| C14 | 8.1 | 0.5 | 0.0 | 0.0 |
| C15 | 6.8 | 1.6 | 1.9 | 0.0 |
| C16 | 6.9 | 4.0 | 4.4 | 0.0 |
| C17 | 7.3 | 4.9 | 5.2 | 0.0 |
| C18 | 6.8 | 7.4 | 8.6 | 0.0 |
| C19 | 5.7 | 9.3 | 9.7 | 0.0 |
| C20 | 5.3 | 8.3 | 9.7 | 0.5 |
| C21 | 4.0 | 8.0 | 8.5 | 1.3 |
| C22 | 3.2 | 7.6 | 6.8 | 3.1 |
| C23 | 2.6 | 6.2 | 5.5 | 4.7 |
| C24 | 2.0 | 5.6 | 4.4 | 7.5 |
| C25 | 2.2 | 3.9 | 4.6 | 9.2 |
| C26 | 1.9 | 3.9 | 4.2 | 9.6 |
| C27 | 1.8 | 3.9 | 4.0 | 10.5 |
| C28 | 1.8 | 3.6 | 3.9 | 10.4 |
| C29 | 1.6 | 3.5 | 3.6 | 9.0 |
| C30 | 1.4 | 3.1 | 2.9 | 6.9 |
| C31 | 1.1 | 2.8 | 2.4 | 7.1 |
| C32 | 1.0 | 2.4 | 2.2 | 4.7 |
| C33 | 0.8 | 1.8 | 1.6 | 3.5 |
| C34 | 0.6 | 1.5 | 1.3 | 2.8 |
| C35 | 0.6 | 1.2 | 1.2 | 2.2 |
| C36 | 0.5 | 1.3 | 1.0 | 2.1 |
| C37 | 0.3 | 0.8 | 0.6 | 1.3 |
| C38 | 0.2 | 0.7 | 0.5 | 1.0 |
| C39 | 0.2 | 0.5 | 0.3 | 0.8 |
| C40 | 0.1 | 0.5 | 0.3 | 0.6 |

TABLE 1-continued

Results showing that the wax produced by the process of the present invention can match industry standards (<1% C20 hydrocarbons) with 2 passes in a short path distillation process.

| Component | Mass fraction (% wt) | | | |
|---|---|---|---|---|
| | Crude wax | Distilled wax (1st pass) | Distilled wax (1st pass-simulation) | Distilled wax (2nd pass) |
| C41 | 0.1 | 0.3 | 0.2 | 0.4 |
| C42 | 0.1 | 0.3 | 0.2 | 0.3 |
| C43 | 0.0 | 0.2 | 0.1 | 0.2 |
| C44 | 0.0 | 0.2 | 0.1 | 0.1 |
| C45 | 0.0 | 0.1 | n/a | 0.0 |
| C20− | 72.0 | 36.0 | 39.6 | 0.5 |
| C21+ | 28.0 | 63.8 | 60.4 | 99.5 |

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A microwave pyrolysis process for the depolymerization of plastic for the production of monomers, waxes and heavy oils comprising the steps of:
    a) oxygen purge of said plastic and from about 0.5% to about 50% w/w of a catalyst, in a media;
    b) pyrolysis of said plastic and said catalyst in said media with a microwave (MW) for a time sufficient to allow generation of heat providing a thermal treatment between 300° C. and 650° C. through absorption of microwaves by said catalyst and said media, thereby obtaining the monomers, the waxes and the heavy oils, wherein said catalyst comprises a compound having a dielectric loss at a frequency of the MW chosen to absorb microwaves, transfer heat to said plastic and initiate a pyrolysis reaction, and
    c) condensing said waxes in a first condenser having an operating temperature sufficient to maintain said waxes liquid, and said monomers and heavy oils in a vapor form, to provide a condensed waxes fraction; and condensing said monomers and heavy oils in a second condenser having an operating temperature lower than said first condenser and sufficient to maintain said monomers and heavy oils liquid and provide a condensed monomers and heavy oils fraction, or a combination thereof.

2. The pyrolysis process of claim 1, wherein said media is agitated under mixing conditions for minimizing segregation of said plastic and said catalyst.

3. The pyrolysis process of claim 2, wherein said media is eccentric relative to a longitudinal axis of rotation of said media.

4. The pyrolysis process of claim 1, wherein said catalyst is present at about 0.5% to about 5% w/w of said reaction.

5. The pyrolysis process of claim 1, wherein said catalyst is present at about 0.5% to about 2.5% w/w of said reaction.

6. The pyrolysis process of claim 1, wherein thermal treatment is between 350° C. and 500° C.

7. The pyrolysis process of claim 1, wherein said catalyst is the carbonaceous residue from a previously performed pyrolysis reaction, a ceramic bead comprising microwave absorbing additives, a pellet comprising microwave absorbing additives, or combinations thereof.

8. The pyrolysis process of claim 7, wherein said microwave absorbing additive is a silicon carbide.

9. The pyrolysis process of claim 1, wherein an internal wall of said media is heated at a temperature sufficient to avoid solidification of a material thereon.

10. The pyrolysis process of claim 9, wherein said temperature sufficient to avoid solidification of a material thereon is about 200-250° C.

11. The pyrolysis process of claim 1, wherein oxygen content within said media is monitored prior to initiation of step b), to ensure all oxygen is purged.

12. The pyrolysis process of claim 11, wherein step b) is initiated when said oxygen content is at a suitable residual content for said pyrolysis to proceed.

13. The pyrolysis process of claim 12, wherein said suitable residual content of oxygen is one of about 10% v/v and about 5% v/v.

14. The pyrolysis process of claim 1, wherein said plastic is shredded prior to said steam purge.

15. The pyrolysis process of claim 1, wherein said microwave has frequency from about 915 MHz or 2450 MHz.

16. The pyrolysis process of claim 15, further comprising step d):
   d) pumping said condensed waxes fraction in a first container; pumping said condensed monomers and heavy oils fraction in a second container, or pumping said condensed waxes fraction, and/or a condensed monomers and/or a heavy oils fraction into said media, for further pyrolysis, or a combination thereof.

17. The pyrolysis process of claim 16, wherein said first container and said second container are the same.

18. The pyrolysis process of claim 1, wherein said first condenser operating temperature that maintains said waxes fraction liquid is from about 55° C. to about 90° C.

19. The pyrolysis process of claim 18, wherein said first condenser operating temperature is about 80° C.

20. The pyrolysis process of claim 1, wherein said first condenser operating temperature is a temperature around the dew point of a compound to be recovered.

21. The pyrolysis process of claim 1, wherein said first condenser is further operable to recover a dimer and/or a trimer not decomposed to the monomers during said pyrolysis.

22. The pyrolysis process of claim 21, further comprising the step of reintroducing said dimer and/or trimer into said media for further pyrolysis.

23. The pyrolysis process of claim 1, wherein said second condenser operating temperature that maintains monomers and heavy oils in a vapor form, such as from about 2° C. to about 10° C.

24. The pyrolysis process of claim 23, wherein said second condenser operating temperature is about 4° C.

25. The pyrolysis process of claim 24, further comprising step e):
   e) fractionating said condensed waxes fraction to obtain a purified wax; fractionating said condensed monomers and heavy oils fraction to obtain purified monomers and purified heavy oil, or combinations thereof.

* * * * *